Oct. 27, 1970   R. ZEIRINGER   3,536,939
PIEZOELECTRIC ACCELEROMETER WITH COOLING
THROUGH THE BASEPLATE
Filed July 31, 1968   3 Sheets-Sheet 1

Inventor
Rudolf Zeiringer
By
Watson Cole Grindle & Watson, Attys.

United States Patent Office 3,536,939
Patented Oct. 27, 1970

3,536,939
PIEZOELECTRIC ACCELEROMETER WITH COOLING THROUGH THE BASEPLATE
Rudolf Zeiringer, Graz, Austria, assignor to Hans List, Graz, Austria
Filed July 31, 1968, Ser. No. 749,165
Claims priority application Austria, Aug. 2, 1967,
A 7,199/67
Int. Cl. H04r 17/00; H01v 7/00
U.S. Cl. 310—8.4
3 Claims

ABSTRACT OF THE DISCLOSURE

A piezoelectric accelerometer is protected from severe thermal stresses by a heat dissipating baseplate having graduated radial and annular recesses on the outside face thereof.

---

Figure 1:
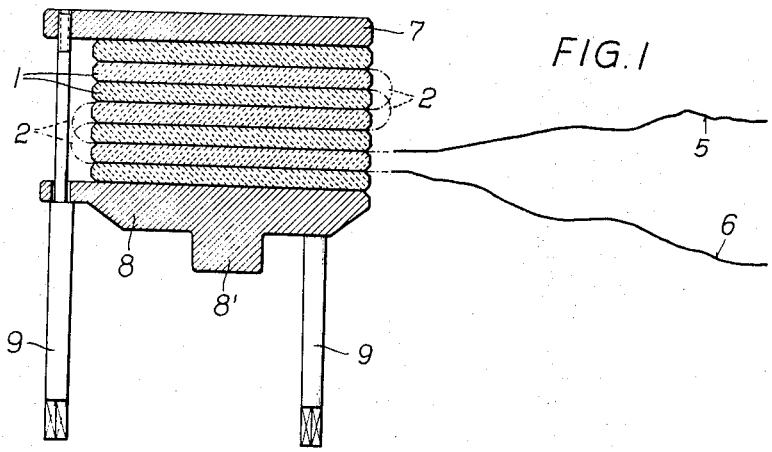

The invention relates to a process for the manufacture of a piezoelectric accelerometer comprising a prestressed set of measuring crystals mechanically coupled with the seismic mass and provided with electrodes and lead wires as well as connection plugs mounted on one side of the transducer housing and conductively connected with the discharge electrodes.

In actual practice, conventional methods of manufacturing piezoelectric accelerometers proved to be both cumbersome and time-consuming and consequently, unsuitable for serial production on economic grounds. Individual elements of the unit were generally assembled by bolting and screwing and it was found to be particularly difficult to conform to established standards of prestress for the set of measuring crystals and to ensure adequate sealing of the tarnsducer housing. In operation, accelerometers produced according to such methods frequently showed a loss of prestress due to the fact that boltings are highly sensitive to shocks and vibrations. Another source of errors was found to reside in the progressive deterioration of insulating properties.

It is the object of the present invention to provide a method by which the manufacture of piezoelectric accelerometers is greatly simplified and the maintenance of preset values of prestress and insulation of the set of measuring crystals assured under all operating conditions. According to the invention, the set of measuring crystals is prefabricated as a separate unit and prestressed by means of bolts between two disks, whereupon it is checked for alignment, sensitivity and insulation, and installed in the transducer housing, following which the seismic mass is placed upon the set of measuring crystals. A closing member, such as a tubular spring for example, is placed on top of the transducer housing and welded thereon whilst the final prestress is applied, whereupon the clamping bolts of the set of measuring crystals are removed and the housing is sealed hermetically. It is thus possible to check the set of measuring crystals thoroughly prior to the final assembling operation, so as to make sure that the finished units answer predetermined standards of alignment, sensitivity and insulation with a high degree of accuracy. Thus the number of rejects because of inadmissible deviations from the above standards is considerably reduced.

According to another feature of the invention the discharge electrodes are connected with the connection plugs of a connector socket designed as a separate unit whereupon the said socket is welded to the transducer housing. The fact that welding methods are employed exclusively for the attachment of such members as are essential for the operation of the unit, not only reduces manufacturing expenses but provides hermetically sealed connections for these members.

According to a further embodiment of the invention, the closing member and the bushing carrying the connection plug, if any, is connected with the transducer housing by ring welding, thereby restricting heating of the unit to the area of the weld in addition to shortening the time required for welding considerably.

Furthermore, the invention provides for the sealing of the housing by welding locking plugs into bores of the housing provided for the passage of the clamping bolts. By this extremely simple means the set of measuring crystals is sealed off against its environment so as to ensure absolutely impermeability to gases.

It is, however, also possible according to the invention to dry the transducer housing up by heating prior to the sealing operation and to check the insulation value of the unit. Finally, the insulating properties of the unit can be further improved according to the invention by filling the transducer housing with some rare gas such as argon for example prior to the sealing operation.

Accelerometers manufactured in accordance with the present invention are liable to be subject to a rise of temperature, if they are mounted on internal combustion engines for example, the heat produced flowing from the engine to be measured via the bearing surface of the accelerometer into the accelerometer housing. Thus the accelerometer is heated progressively from the bearing surface towards the other members. As a result of this rise of temperature the various component parts of the accelerometer expand depending on the amount of heat affecting them, the said thermal expansion varying not only due to differences in the degree to which individual component parts are heated but also depending on the materials of which these parts are made. This ultimately also has a certain influence on the prestress of the set of measuring crystals which fluctuates as a function of differences in the thermal expansion of various members, thereby altering the basic setting of the accelerometer in particular, resulting in erroneous recordings and misreadings which are not ascribable to accelerations but are solely due to temperature variations.

Therefore, another object of the present invention consists, as far as possible, in the limitation of such a temperature rise of the accelerometer and in the resulting elimination of misreadings. For that purpose, the baseplate of the housing is provided, according to the invention, with radial and annular recesses in its supporting surface. Thus the heat-transfer area from the object to be measured to the accelerometer and consequently, the transmission of heat in this sector is reduced.

According to another feature of the invention the radial recesses extend through the superficies of the housing, so that air is allowed to circulate below the bearing surface, the said air absorbing at least part of the heat still transferred via the said bearing surface. Thus the transfer of heat in the direction of the accelerometer housing is still further reduced.

According to yet another feature of the invention the said circulation of air is achieved by a linear increase of the depth of the radial recesses in the direction of the shell, thereby facilitating the admission of air to the grooves as well as the discharge of air heated in the said sector from the said grooves.

Figure 2:
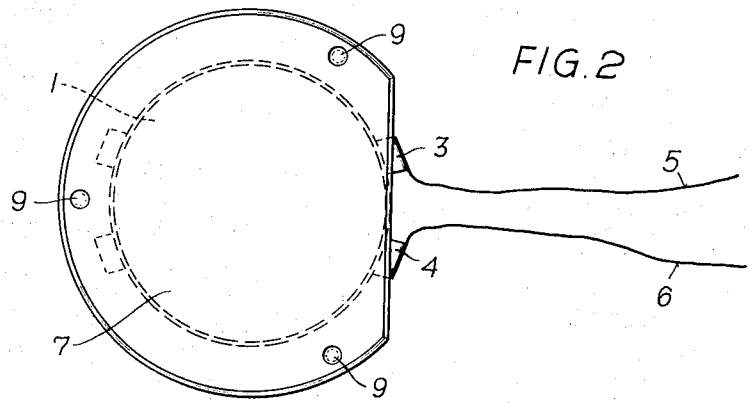
Figure 7:
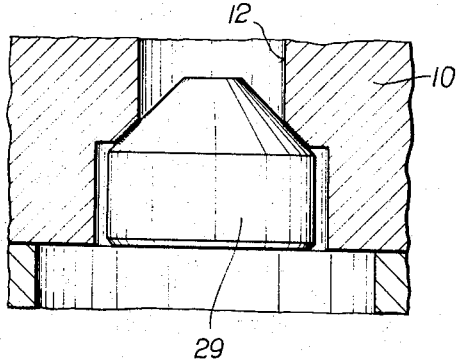
Figure 8:
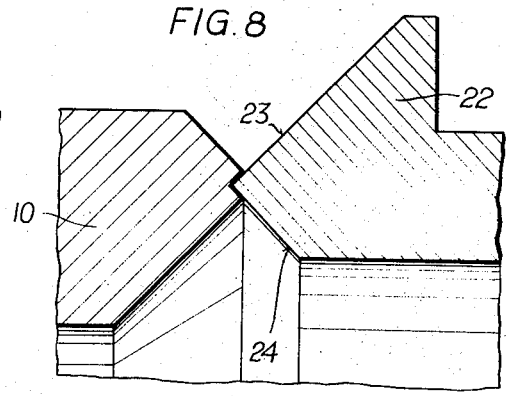
Figure 3:
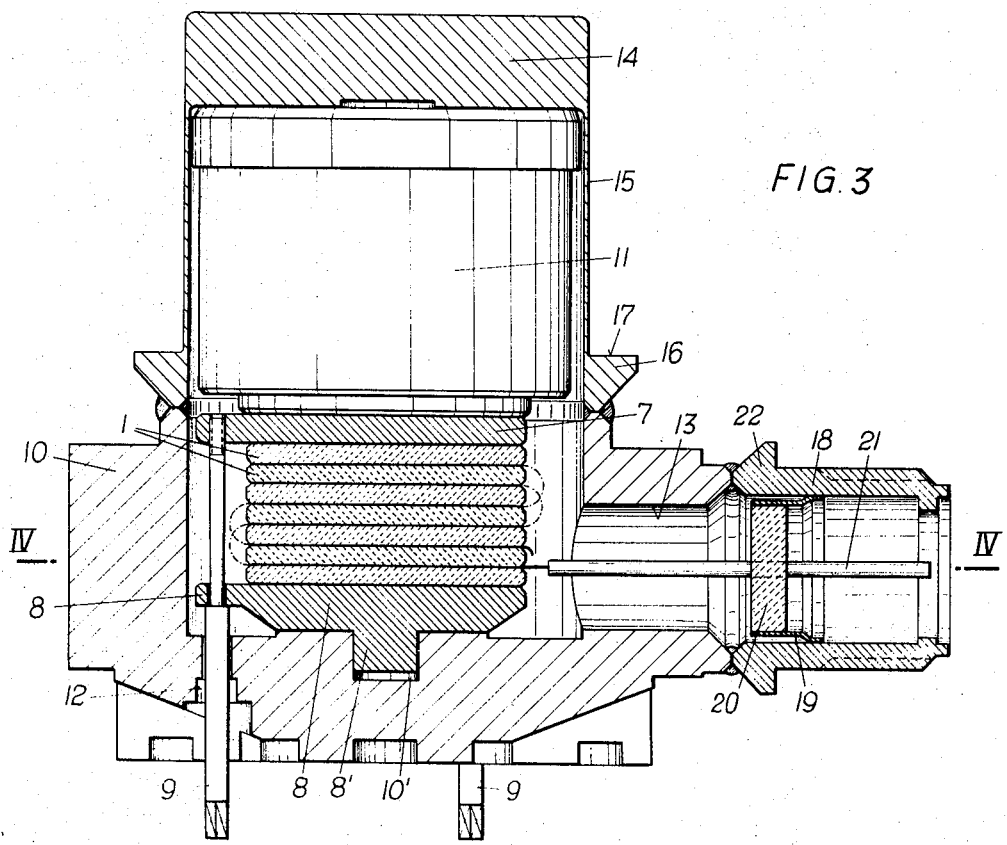
Figure 4:
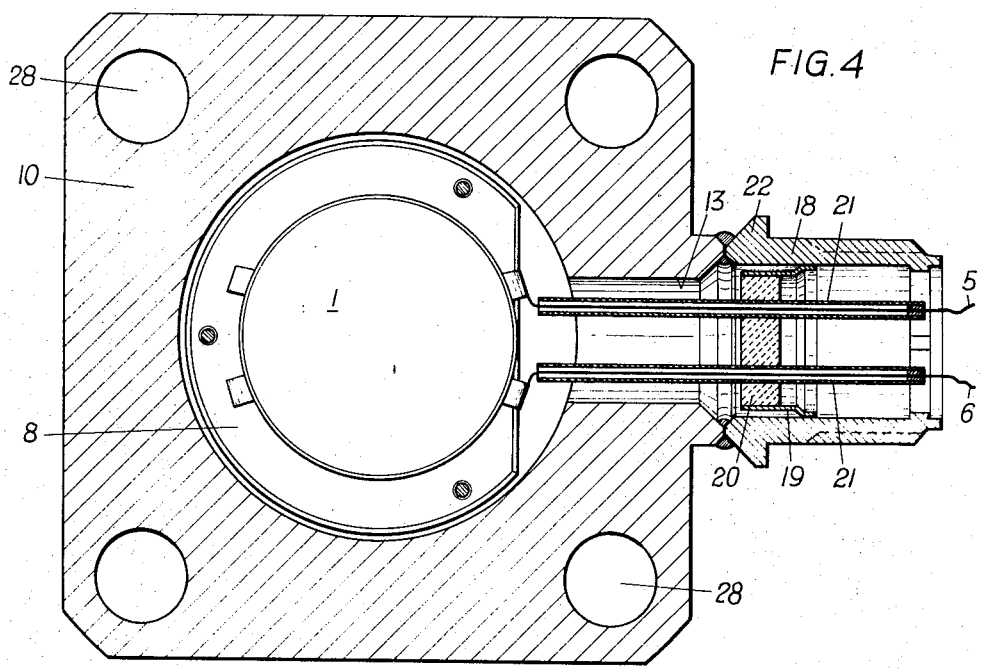
Figure 5:
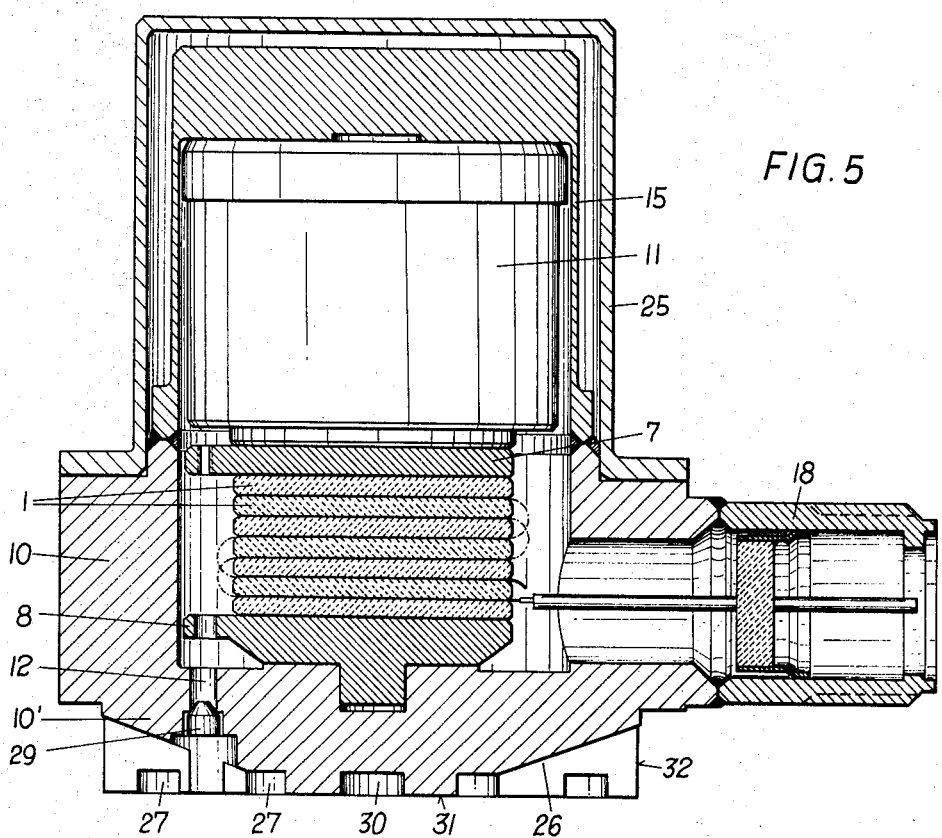
Figure 6:
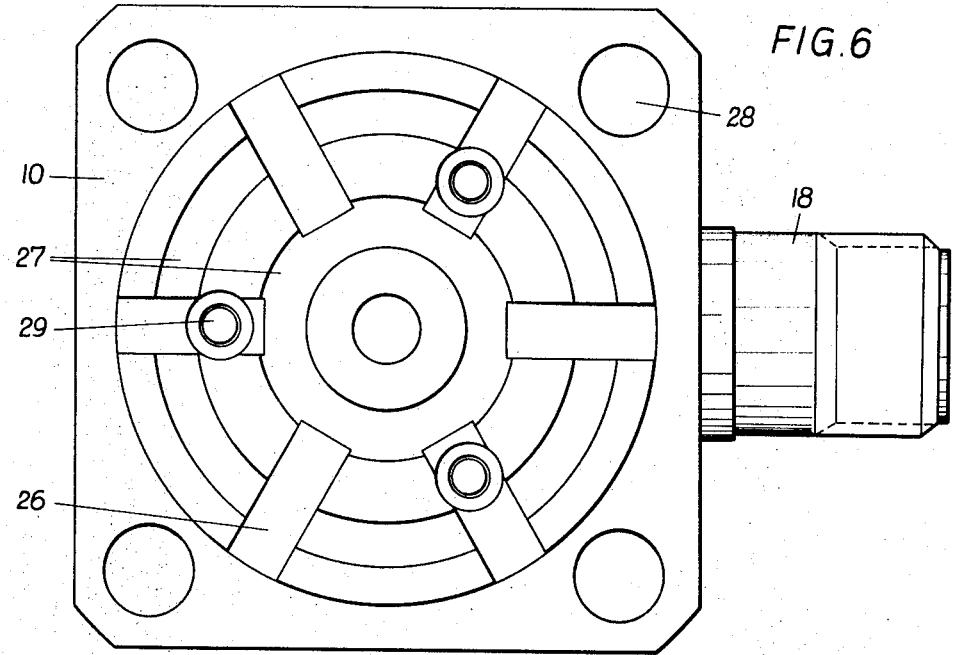

Further details of the invention will become apparent from the following description of an embodiment of the invention illustrated in and by the accompanying drawings in which:

FIG. 1 is an axial cross-sectional view of a prefabricated set of measuring crystals, FIG. 2 a top view of the unit illustrated in FIG. 1, FIG. 3 an axial cross-sectional view of an accelerometer in the manufacturing stage preceding the sealing operation, FIG. 4 an axial cross-sectional view on line IV—IV of FIG. 3, FIG. 5 an axial cross-sectional view of the finished accelerometer corresponding to the view of FIG. 3, FIG. 6 a worm's eye view of the accelerometer illustrated in FIG. 5, FIGS. 7 and 8 each showing a cross-sectional view of a detail of the accelerometer on an enlarged scale.

The prefabricated unit shown in FIGS. 1 and 2 comprises a number of superimposed disks 1 of piezoelectric material with electrodes inserted between them, the said electrodes being preferably formed by vaporized metal layers or inserted metal foils. As indicated in FIG. 1 by dot-dash lines, like electrodes are conductively interconnected by means of webs 2. The discharge electrodes for the positive and negative charges of the set of measuring crystals are provided with lugs 3 and 4 from which lead wires 5 and 6 emerge.

Between two disks 7 and 8 whose diameter exceeds that of the set measuring crystals and which in order to facilitate assembling operations present a cordal cut on the sides adjoining the set of measuring crystals, and are mutually prestressed by means of three clamping bolts 9, the set of measuring crystals is loaded in an axial direction by a predetermined prestressing force.

The use of a prefabricated set of measuring crystals makes it possible for the active sector of the transducer to be checked for alignment, sensitivity and insulation prior to the final assembly of the accelerometer. Such sets of crystal as fail to meet requirements can thus be discarded in time and repaired following their disassembly. In order to avoid edge pressure of the piezoelectric disks 1 in the prestressed condition of the set of measuring crystals liable to cause fractures around the edges of the disks 1, the thickness of the disk 8 is reduced in the area close to its outer rim so as to produce a certain degree of elastic deformability as a result of which the marginal area remains free from peak loads. The disk 8 is furthermore provided with a cylindrical central lug 8' for the purpose of securing and centering the disk 8 in the transducer housing 10.

Upon completion of the inspection the unit as hereabove described inclusive of clamping bolts 9 is inserted in the transducer housing 10 (FIG. 3) with the lug 8' of the disk 8 engaging in a blind bore 10' of the housing 10 with a press fit, so as to preclude misreadings due to inertia forces of the disk 8 during decelerations. The housing 10 is provided with three bores 12 for the passage of the bolts 9. The lead wires 5 and 6 are first passed through an initially open lateral connecting bore 13 in a manner not illustrated in the drawings.

Now the seismic mass 11 is placed upon the upper disk 7 of the prefabricated measuring unit and topped by a tubular spring 15 provided with a solid bottom 14 and carrying a welding flange 16 alongside its open rim.

Thereupon the tubular spring 15 is connected in a manner known per set with the transducer housing 10 by electric resistance welding (ring welding) whilst at the same time the final prestress is applied alongside its flange 16, the annular shoulder 17 of the welding flange 16 serving as a supporting surface for the one electrode (not shown) of a resistance welding apparatus designed as a hollow electrode.

Now the set of measuring crystals is subject to the operational prestress produced by the tubular spring 15 while the clamping bolts 9 are relieved and can be easily unscrewed from the threaded bores of the disk 7 and removed through the bores 12 of the housing 10.

During a further stage of operations a connector socket 18 designed as a separate unit and containing an insulator 20 in a stepped sheet-metal sleeve 19 with two hollow plug pins 21 embedded in the said insulator body, is moved close to the connecting bore 13 of the housing 10, the lead wires 5 and 6 being passed through the hollow plug pins 21. Now the connector socket 18 is welded to the transducer housing 10 alongside its rim provided with a welding flange 22 in alignment with the connecting bore 13. As appears from FIG. 8, tapered centering surfaces 23 and 24 provided on the welding flange 22 engage in mating countersurfaces of the housing 10 for the purpose of centering the connector socket 18 on the housing. After the connector socket 18 has been welded to the transducer housing, the ends of the two lead wires 5 and 6 are hard-soldered to the outer extremities of the plug pins 21.

Is is now possible for the transducer first to be dried by heating and to be checked for its insulation value if necessary, prior to the final completion of the accelerometer including hermetic sealing of the transducer housing. Particularly favorable insulating properties can be obtained by filling the interior of the housing with a rare gas, such as argon, for example. Now, the housing is hermetically sealed by welding locking plugs 29 into the bores 12 of the housing (see FIG. 7 in particular).

As far as necessary, the welding flanges 16 and 22 are removed by turning and a protecting cap enclosing the tubular spring 15 is mounted on top of the housing 10. The finished accelerometer as hereabove described is illustrated in FIGS. 5 and 6 of the drawings.

The base 10' of the housing presents six radial grooves 26 uniformly distributed over its circumference. Besides, annular grooves 27 are arranged in concentric relation to each other and to the housing 10 and forming a network of channels in conjunction with the radial grooves 26. Finally, a central recess 30 is provided. The said radial and annular grooves serve to interrupt or reduce the bearing surface 31 in the direction of the object to be measured, thereby diminishing the transfer of heat to the accelerometer accordingly. This transfer of heat is further reduced by air circulating through the radial channels extending through the superficies 32 of the housing 10. This circulation of air is greatly helped by the linear increase of the depth of the radial grooves 26 in an outward direction.

The above description refers to a preferred embodiment of the present invention only. It is of course, possible within the scope of the present invention, to manufacture accelerometers of different design in accordance with the method hereabove described. For example, prestress may be produced not by a tubular spring 15 as illustrated in the drawing, but by a system of springs composed of one or a plurality of plate springs inserted between the seismic mass and the bottom of a pot-shaped closing member with solid walls welded to the transducer housing. Likewise, the thinwalled portion of the tubular spring can be integral with the transducer housing, the aperture of the tubular spring being closed by a disk-shaped closing member welded to its annular rim.

I claim:

1. A piezoelectric accelerometer comprising a transducer housing, a piezoelectric measuring element inserted in the said transduced housing, a seismic mass placed upon the said measuring element, a tubular spring surrounding the seismic mass and having a bottom adjacent to an outer front face of the seismic mass, the tubular spring being welded to the said transducer housing, a baseplate located on the side of the transducer housing opposite the tubular spring, an even bearing surface on the said baseplate, and radial and annular recesses in the said bearing surface of the base plate of the transducer housing.

2. A piezoelectric accelerometer according to claim 1, wherein the said radial recesses extend through the superficies of the said baseplate of the transducer housing.

3. A piezoelectric accelerometer according to claim 2 wherein the said radial recesses are of a depth showing a linear increased in the direction of the superificies of the said baseplate.

References Cited

UNITED STATES PATENTS

| | | | |
|---|---|---|---|
| 2,714,672 | 8/1955 | Wright et al. | 310—8.7 X |
| 3,075,098 | 1/1963 | Shoor | 310—9.1 X |
| 3,150,274 | 9/1964 | Pischinger | 310—8.9 |
| 3,233,465 | 2/1966 | Tolliver et al. | 310—8.4 X |
| 3,349,259 | 10/1967 | Kistler | 310—8.7 |
| 3,351,787 | 11/1967 | Kistler | 310—9.1 X |
| 3,390,286 | 6/1968 | Gradin et al. | 310—9.1 X |
| 3,397,329 | 8/1968 | Riedel | 310—8.7 |
| 3,400,284 | 9/1968 | Elazar | 310—9.1 X |
| 3,424,930 | 1/1969 | List et al. | 310—9.1 X |
| 3,429,031 | 2/1969 | Kistler | 310—9.1 X |

WARREN E. RAY, Primary Examiner

M. O. BUDD, Assistant Examiner

U.S. Cl. X.R.

310—9.1